US010554345B2

(12) United States Patent
Nammi et al.

(10) Patent No.: US 10,554,345 B2
(45) Date of Patent: Feb. 4, 2020

(54) INDICATING RETRANSMITTED CODEBLOCK GROUPS IN 5G WIRELESS COMMUNICATION SYSTEMS

(71) Applicant: AT&T Intellectual Property I, L.P., Atlanta, GA (US)

(72) Inventors: SaiRamesh Nammi, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 58 days.

(21) Appl. No.: 15/674,106

(22) Filed: Aug. 10, 2017

(65) Prior Publication Data

US 2019/0052415 A1 Feb. 14, 2019

(51) Int. Cl.
| | |
|---|---|
| *H04L 1/08* | (2006.01) |
| *H04L 1/18* | (2006.01) |
| *H04L 1/00* | (2006.01) |
| *H04W 28/04* | (2009.01) |
| *H04W 72/04* | (2009.01) |

(52) U.S. Cl.
CPC .......... *H04L 1/1816* (2013.01); *H04L 1/0041* (2013.01); *H04L 1/0057* (2013.01); *H04L 1/0061* (2013.01); *H04W 28/04* (2013.01); *H04W 72/042* (2013.01)

(58) Field of Classification Search
CPC ... H04L 1/1621; H04L 1/1816; H04L 1/0041; H04L 1/0057; H04L 1/1819; H04L 1/1893
See application file for complete search history.

(56) References Cited

U.S. PATENT DOCUMENTS

| | | | |
|---|---|---|---|
| 8,780,817 B2 | 7/2014 | Farajidana et al. | |
| 8,780,821 B2 | 7/2014 | Zhang et al. | |
| 9,032,267 B2 | 5/2015 | Shimanuki et al. | |

(Continued)

FOREIGN PATENT DOCUMENTS

CN 104301077 A 1/2015

OTHER PUBLICATIONS

International Search Report and Written Opinion for International Application Serial No. PCT/US2018/045498 dated Nov. 16, 2018, 15 pages.

(Continued)

*Primary Examiner* — Shelly A Chase
(74) *Attorney, Agent, or Firm* — Amin, Turocy & Watson, LLP

(57) ABSTRACT

Various embodiments disclosed herein provide for a retransmission system that uses a hybrid system to signal to a receiver the retransmission of codeblock groups to reduce network overhead and bandwidth. The amount of bandwidth needed to signal to a receiver which codeblock groups are being retransmitted is directly proportional to the number of codeblock groups. Therefore, during retransmission, if the number of a codeblock groups is below a predetermined threshold, then explicit signaling can be performed, where the transmitter sends a bit map identifying the codeblock groups being retransmitted. If the number of codeblock groups is above the threshold however, can use a codeblock group confirmation bit in the control information sent to the receiver, where the values of the bit can inform the receiver how the retransmission will be performed.

20 Claims, 10 Drawing Sheets

(56) References Cited

U.S. PATENT DOCUMENTS

| | | | |
|---|---|---|---|
| 9,236,918 B2 | 1/2016 | Toda et al. | |
| 9,294,959 B2 | 3/2016 | Seyama et al. | |
| 9,479,316 B2 | 10/2016 | Sun et al. | |
| 2010/0031110 A1* | 2/2010 | Seok | H04L 1/1621 714/748 |
| 2010/0223534 A1* | 9/2010 | Earnshaw | H03M 13/1505 714/780 |
| 2016/0226643 A1 | 8/2016 | Mallik et al. | |
| 2016/0285589 A1 | 9/2016 | Mukkavilli et al. | |
| 2017/0026297 A1 | 1/2017 | Sun et al. | |
| 2017/0085343 A1 | 3/2017 | Seo et al. | |
| 2017/0126378 A1 | 5/2017 | Luo et al. | |
| 2017/0142593 A1 | 5/2017 | Seo et al. | |
| 2017/0207895 A1 | 7/2017 | Yang et al. | |
| 2018/0034596 A1* | 2/2018 | Noh | H04L 1/1812 |
| 2018/0270022 A1* | 9/2018 | Sun | H04L 1/1893 |
| 2018/0270023 A1* | 9/2018 | Jiang | H04L 1/1819 |
| 2018/0375616 A1* | 12/2018 | Beale | H04L 1/1816 |

OTHER PUBLICATIONS

Samsung, "DL scheduling for CBG-based Retransmissions," 3GPP Draft; RI-1708034—DL Scheduling for CBG Retransmissions, 3rd Generation Partnership Project (3GPP), Mobile Competence Centre, 650, Route Des Lucioles, F-06921 Sophia-Antipolis Cedex, France, vol. RAN WG1, No. Hangzhou; May 15, 2017-May 19, 2017, May 14, 2017 (May 14, 2017), XP051273230, Retrieved from the Internet: URL:http://www.3gpp.org/ftp/Meetings_3GPP_SYNC/RAN1/Docs/ [retrieved on May 14, 2014], 7 pages.

Samsung, "Scheduling for CBG-based Retransmissions," 3GPP Draft; RI-1710726, 3rd Generation Partnership Project (3GPP), Mobile Competence Centre; 650, Route Des Lucioles; F-06921 Sophia-Antipolis Cedex; France, vol. RAN WGI, No. Qingdao, P.R. China; Jun. 27, 2017-Jun. 30, 2017 Jun. 26, 2017 (Jun. 26, 2017), XP051299931, Retrieved from the Internet: URL:http://www.3gpp.org/ftp/Meetings_3GPP_SYNC/RANI/Docs/ [retrieved on Jun. 26, 2017], 8 pages.

* cited by examiner

INDICATING RETRANSMITTED CODEBLOCK GROUPS IN 5G WIRELESS COMMUNICATION SYSTEMS

TECHNICAL FIELD

The present application relates generally to the field of mobile communication and, more specifically, to signaling retransmitted codeblocks segments in a next generation wireless communications network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
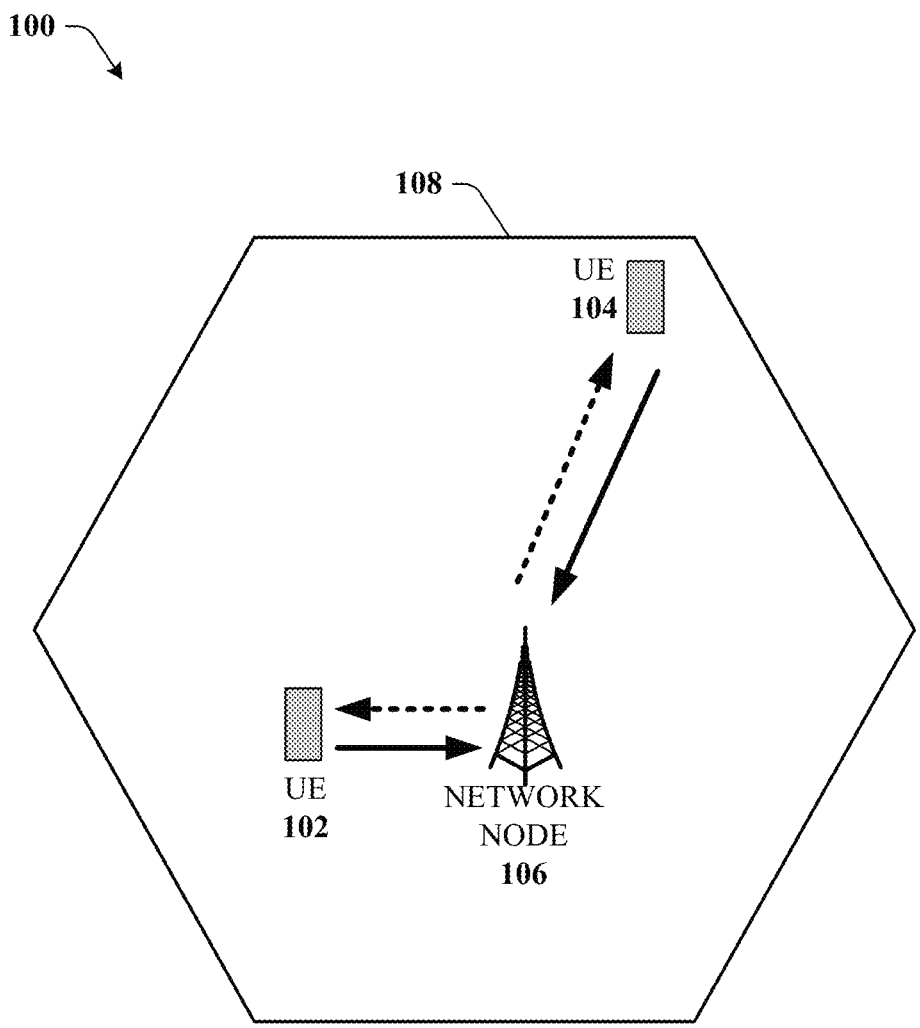
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for a retransmission system that uses a hybrid system to signal to a receiver the retransmission of codeblock groups to reduce network overhead and bandwidth. The amount of bandwidth needed to signal to a receiver which codeblock groups are being retransmitted is directly proportional to the number of codeblock groups. Therefore, during retransmission, if the number of a codeblock groups is below a predetermined threshold, then explicit signaling can be performed, where the transmitter sends a bit map identifying the codeblock groups being retransmitted. If the number of codeblock groups is above the threshold however, the resources to explicitly identify the codeblock groups would be much higher, and so the transmitter can implicitly identify the codeblock groups. The transmitter can use a codeblock group confirmation bit in the control information sent to the receiver, where the values of the bit can inform the receiver how the retransmission will be performed. If the value of the bit is set to a first value (e.g., one) then receiver would understand that the transmitter is retransmitting the same codeblock groups which were previously reported as not being received (e.g., negative acknowledgement "NAK") during a hybrid automatic repeat request (HARQ) process. If the value of the codeblock group confirmation bit is set to the alternate value, then the receiver should understand that the transmitter will use a conventional HARQ process, and retransmit the entire transport block (comprising a group of codeblock groups).

Hence with the above technique of CBG confirmation bit, we can reduced the signaling overhead significantly. Note that during the first transmission i.e when the new data indicator is equal to 1, the contents of CBG confirmation bit is arbitrary as CBG based transmission is meaningless for first transmission. It is to be appreciated that throughout this description that reference is made to downlink retransmission (e.g., retransmitting from the mobile network/base station to the user equipment) but the principles herein can apply to uplink or sidelink communications as well.

Similarly, note that for simplicity we use the radio network node or simply network node is used for gNB. It refers to any type of network node that serves UE and/or connected to other network node or network element or any radio node from where UE receives signal. Examples of radio network nodes are Node B, base station (BS), multi-standard radio (MSR) node such as MSR BS, gNB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Likewise, for reception we use the term user equipment (UE). It refers to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports are also interchangeably used but carry the same meaning in this disclosure.

In various embodiments, a base station device can comprise a processor and a memory that stores executable instructions that, when executed by the processor facilitate performance of operations. The operations can comprise receiving a request, from a user equipment device, to retransmit a codeblock group, wherein the codeblock group was previously transmitted to the user equipment device. The operations can also include determining whether the request to retransmit comprises cyclic redundancy check bits appended to the request. The operations can also comprise, in response to the cyclic redundancy check bits being determined to be appended to the request, transmitting downlink control information comprising a codeblock group indicator bit that signals a mode of retransmission. The operations can also comprise retransmitting the codeblock group to the user equipment device based on the mode.

In another embodiment, method comprises determining, by a base station device comprising a processor, a first number of codeblock groups that are scheduled for transmission to a user equipment device. The method can also comprise determining, by the base station device, a second number of codeblock groups associated with a defined criterion relating to efficiency. The method can also comprise signaling, by the base station device, retransmission of a codeblock group to the user equipment device according to a first protocol in response to the first number being larger than the second number, and signaling retransmission of the codeblock group according to a second protocol in response to the first number being smaller than the second number.

In another embodiment machine-readable storage medium, comprising executable instructions that, when executed by a processor of a device, facilitate performance of operations. The operations can comprise determining a first number of codeblock groups that are scheduled for transmission to a user equipment device. The operations can also comprise determining a second number of codeblock groups associated with a predetermined criterion relating to efficiency. The operations can also comprise signaling retransmission of a codeblock group to the user equipment device in a first manner in response to the first number being determined to be larger than the second number, and signaling retransmission of the codeblock group in a second manner in response to the first number being determined to be smaller than the second number.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, network node 106 and UE 102 and 104 can employ codeblock segmentation when transmitting data to each other. Transport blocks can be segmented into codeblock groups that collectively comprise the data carried in the transport block. Cyclic redundancy check (CRC) bits can be added to each codeblock group and codeblock groups can be individually checked for errors at the receiver. If an error is found, it is possible to request retransmission of just the codeblock group in error, rather than retransmitting the entire transport block, thus improving efficiency and lowering overhead requirements. The manner in which the transmitter signals to the receiver how the retransmissions are to be performed, and which codeblock groups are being retransmitted concerns the disclosure herein.

The main idea is that if the number of codeblock groups (say L) are small, then the network will indicate the failed codeblock groups with explicit indication. If the number of codeblock groups are large, then to reduce the overhead in the downlink control channel, then the network uses an implicit signaling explained later in this section. This is because when the number of CBGs are less than $L_{th}$, then the uplink control channel (which indicates which CBGs are in error) is not reliable as adding cyclic redundancy check (CRC) on small number of information bits consumes resources, while if the number of CBGs are greater than $L_{th}$, then the uplink control channel is CRC protected, implies that the feedback received is 100% reliable there by avoiding the mismatch between the transmitter and the receiver during retransmissions.

For this algorithm to work, the network should determine the number of codeblock groups L and the predetermined threshold number of codeblock groups $L_{th}$ a priori. In one embodiment, the network can determine L based on the maximum number of codeblock groups as configured by the network, i.e. it is signaled to the UE using RRC signaling. In another embodiment, the network can compute the number of codeblock groups scheduled for the UE in that particular slot (or TTI). Note that in this case the value of L is always less than the maximum number of codeblock groups (as signaled to the UE using radio resource control "RRC" signaling).

In an embodiment, the value of $L_{th}$ can be determined in multiple ways. For example, the standard can set the value of $L_{th}$. i.e say if the $L_{th}=11$ as an example, in another embodiment the network can indicate this value to the UE so that the network and the UE are in completely in sync when to use/expect explicit signaling and when to use/expect implicit signaling. In another embodiment, $L_{th}$ can be determined based on channel conditions reported by the UE.

Figure 2:
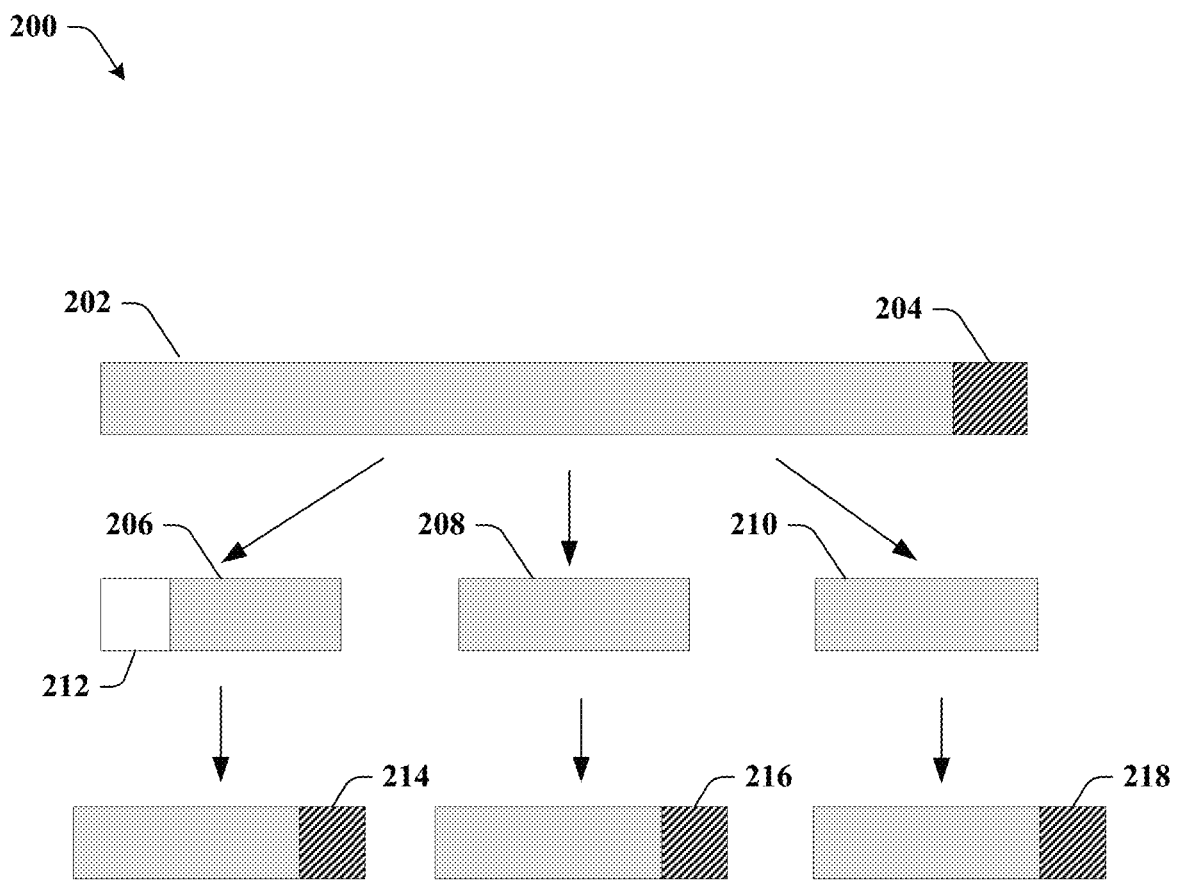
FIG. 2 illustrates an example block diagram showing codeblock segmentation in accordance with various aspects and embodiments of the subject disclosure.

Turning now to FIG. 2, illustrated is an example block diagram 200 showing codeblock segmentation in accordance with various aspects and embodiments of the subject disclosure.

In 5G systems or NR (New Radio) for data transmission, a transport block 202 can be encoded using a low density parity check (LDPC) code. In the first step of the physical-layer processing, an M-bit CRC 204 is calculated for and appended to each transport block. The CRC 204 allows for receiver-side detection of errors in the decoded transport block. The corresponding error indication can, for example, be used by the downlink hybrid-ARQ protocol as a trigger for requesting retransmissions. If the transport block 202, including the transport-block CRC 204, exceeds the maximum code-block size of 8192 bits, code-block segmentation is applied before the LDPC coding. Code-block segmentation means that the transport block is segmented into smaller codeblocks (e.g., codeblocks 206, 208, and 210), the sizes of which should match the set of code-block sizes supported by the LDPC coder. In order to ensure that a transport block of arbitrary size can be segmented into codeblocks that match the set of available code-block sizes, the specification includes the possibility to insert "dummy" filler bits 212 at the head of the first codeblock 206.

In an embodiment, the transmitter can then add CRC bits 214, 216, and 218 to each of the codeblock segments 206, 208, and 210 so that a receiver can determine whether any of the individual codeblock segments have been corrupted during transmission. For instance, if codeblock segment 206 is corrupted, when the receiver performs a parity check on CRC bits 214, the receiver can determine that the codeblock segment 206 contains an error, and the receiver can request a retransmission.

In an embodiment, transmissions between the network node (e.g., base station device, or gNB (gNodeB in 5G)) 106 and the mobile devices 102 and 104 can have errors introduced due to poor signal to interference plus noise ratios, interference, passive intermodulation, and other factors which can cause one or more of the codeblock segments to contain errors, which would require retransmission.

As an example, mobile device 104 is further away from the network node 106 than is mobile device 102. If the transport block 202 is split into 3 segments for a transmission to a mobile device 104, then a transmission to mobile device 102 may contain 4 or 5 or a greater number of segments, since a transmission to mobile device 102 is less likely to contain errors.

In other embodiments, mobile devices moving faster (e.g., having a higher doppler frequency shift) relative to the network node can also have increased errors. Similarly, mobile devices with connections to the network node that have lower signal to interference plus noise ratios can also have lower transmission reliabilities.

In multi-antenna transmitters and receivers, depending on the frequency of the transmission, or location of the mobile device relative to the transmitter, different antennas of the multiantenna transmitter can be more or less likely to have codewords containing errors due to passive or active intermodulation and other interference effects. Accordingly, codewords and transport blocks transmitted by respective antennas can have different segmentation rates.

Figure 3:
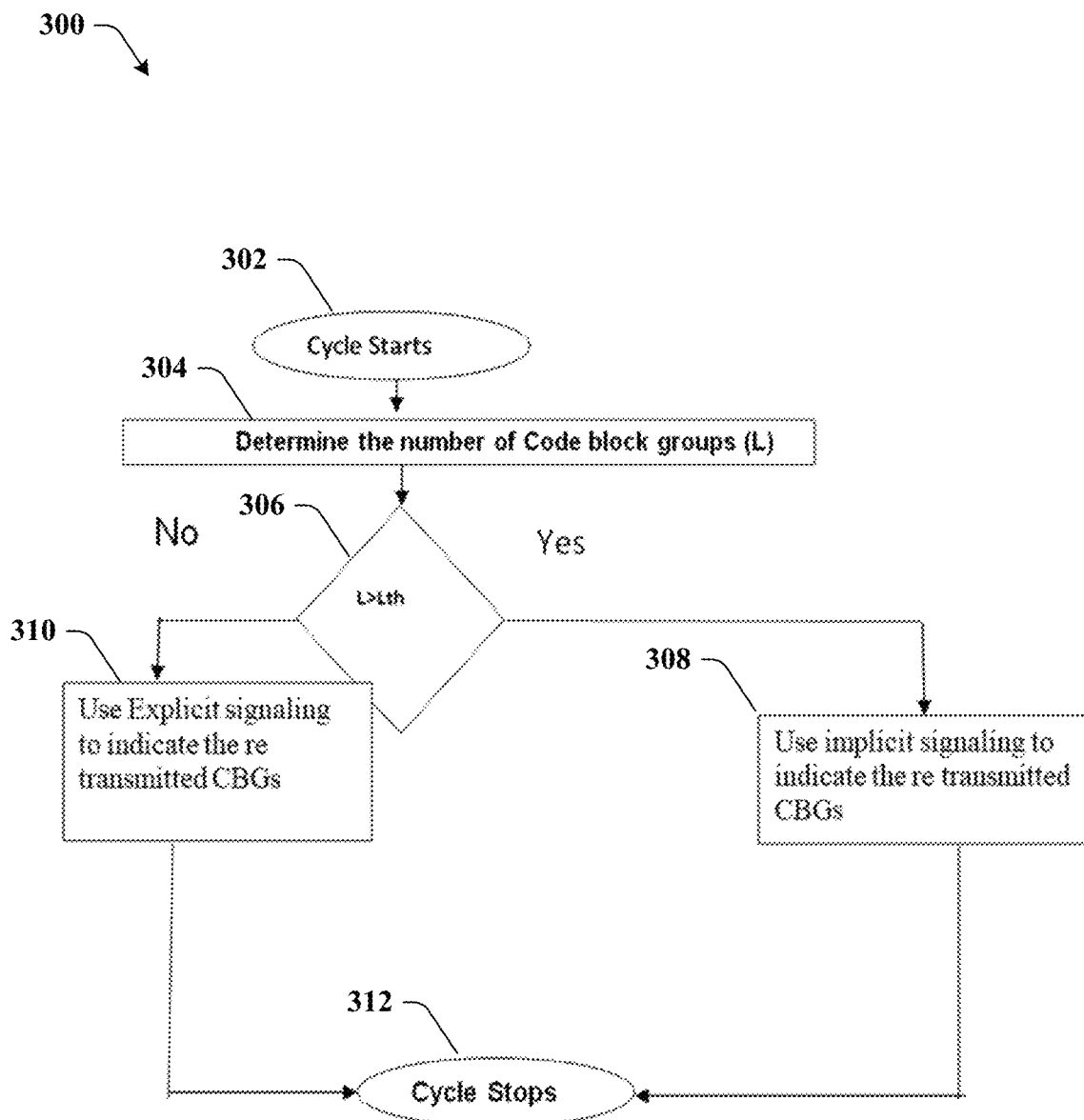
FIG. 3 illustrates an example flowchart for signaling retransmitted codeblock groups in accordance with various aspects and embodiments of the subject disclosure.

Turning now to FIG. 3, illustrates an example flowchart 300 for signaling retransmitted codeblock groups in accordance with various aspects and embodiments of the subject disclosure.

In an embodiment, the flowchart 300 can start at 302, and at 304 the transmitter can determine the number of codeblock groups (L). In an embodiment, the number of codeblock groups can refer to the previously transmitted set of codeblock groups, of which a subset require retransmission. In an example, if a transport block was split into 15 codeblock groups, 3 of which were determined by the receiver to be in error, and the receiver followed a HARQ process to send back a NAK indicating that 3 codeblock groups were in error, L would refer to the total group of 15 codeblock groups. In other embodiments, L refers to the 3 codeblock groups that require retransmission.

In an embodiment, the transmitter can determine L based on the maximum number of codeblock groups as configured by the network, i.e. it is signaled to the UE using RRC signaling. In another embodiment, the network can compute the number of codeblock groups scheduled for the UE in that particular slot (or TTI). Note that in this case the value of L is always less than the maximum number of codeblock groups (as signaled to the UE using RRC signaling).

At 306, the transmitter determines whether the number of codeblock groups L is smaller or greater than $L_{th}$, the predetermined threshold number of codeblock groups. $L_{th}$ can be determined based on the standard set by the network, or based on network conditions. In an embodiment, $L_{th}$ can be 11 or 15.

If L is smaller than $L_{th}$, then the transmitter can use an explicit method of signaling to the receiver at 310. The explicit method can be a bit map indicating the identities of the codeblock groups that are being retransmitted. This is only done however when the number of codeblock groups is relatively small, otherwise the bit map can be very long and the signaling can consume a lot of processing resources and bandwidth. As an example, say the network configures the number of code block groups (N) for the highest number of resources elements say 6600, and where the maximum codeblock size is 8192. Then the bit map length is =6600*8*14*4/8192=90.2344, where the 14 represents the timestamp, and the 4 represents the maximum number of layers. The bit map would thus be around 90 bits long. Then for every retransmission, the network needs to send a bit map of length equal to 90 bits in the downlink control channel. Where the bits positions corresponding to the failed code block groups are set to 1, which indicates to the UE that those codeblock groups are retransmitted.

Due to this, an improvement in network efficiency and reduction in bandwidth can be achieved if the transmitter, in response to the L being larger than $L_{th}$, uses implicit signaling at 308 to indicate the retransmitted codeblock groups. The implicit signaling can incorporate a codeblock group confirmation bit in the downlink control information, which, if activated can indicate to the UE that that network re transmitted the same codeblock groups which were reported as NAK by the UE for the previous downlink transmission for the same HARQ process identifier. When this bit is sent to zero, then the UE should understand that the network is not using codeblock group based re(transmission) and is using conventional HARQ process at the transport block level (e.g., retransmitting the entire transport block, including those codeblock groups that were successfully received and decoded).

In some embodiments, there can be no confirmation bit at all, where the network may skip indicating the codeblock groups confirmation bit in the downlink control channel. This is because, if the and network and the UE knows during retransmissions, the network uses the failed codeblock groups as indicated by the UE will be retransmitted, then there is no use of codeblock group confirmation bit. At 312, the cycle can stop, when the transmitter retransmits the codeblock groups or the transport block based on the signaled method.

Figure 4:
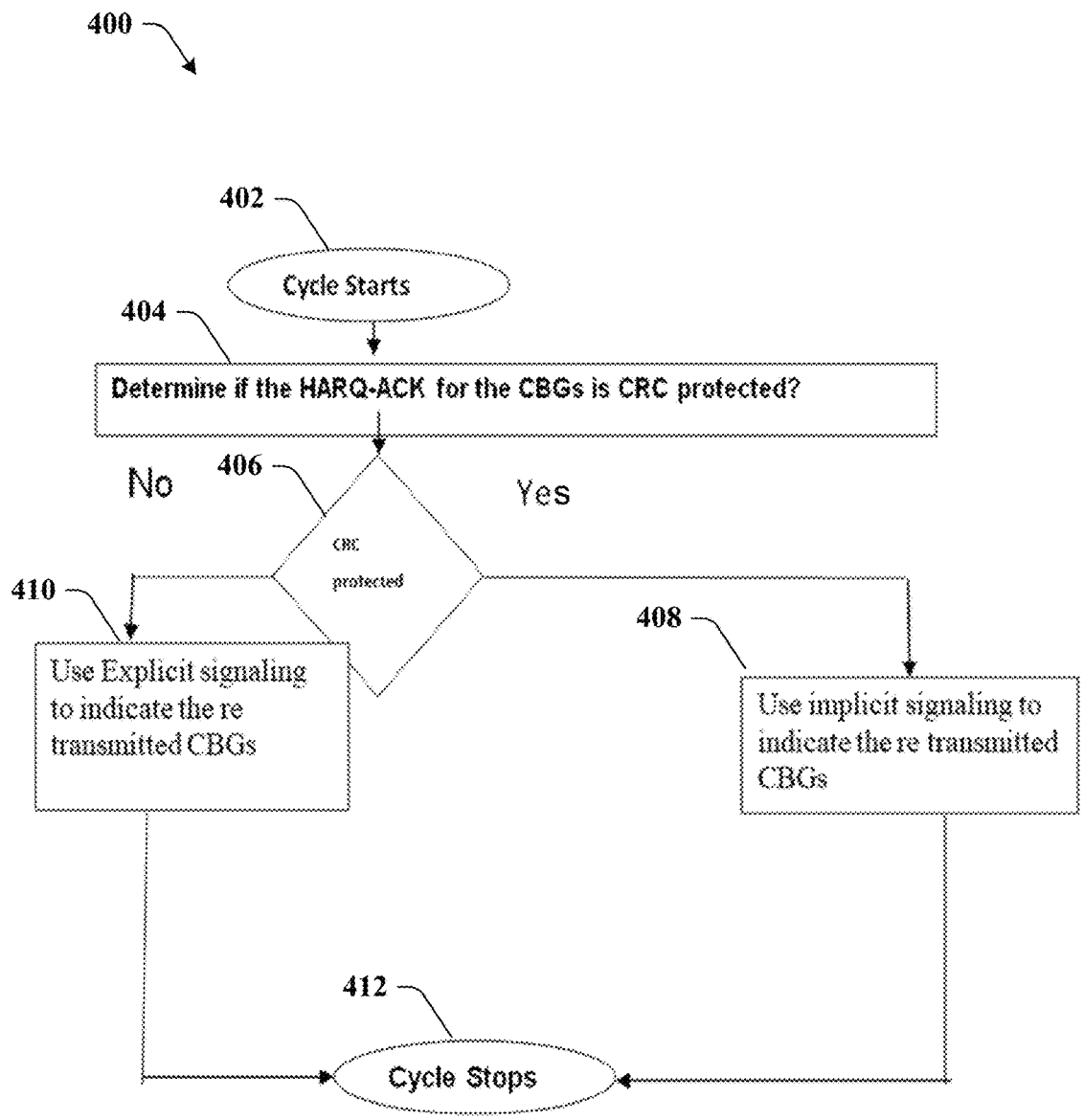
FIG. 4 illustrates an example flowchart for signaling retransmitted codeblock groups in accordance with various aspects and embodiments of the subject disclosure.

Turning now to FIG. 4, illustrated is an example flowchart 400 for signaling retransmitted codeblock groups in accordance with various aspects and embodiments of the subject disclosure. The embodiment shown in flowchart 400 results in the same outcomes as flowchart 300, with the transmitter deciding to use either explicit signaling or implicit signaling, but means of arriving at the outcomes can be slightly different. The cycle starts at 402 and at 404, the transmitter determines whether the HARQ-ACK and HARQ-NAK for the codeblock groups is cyclic redundancy check protected. If the result at 406 is that the HARQ-ACK is CRC protected, then the implicit signaling (e.g., codeblock group confirmation bit etc.) is performed at 408, whereas if there is no CRC protection, then explicit signaling is performed at 410.

Determining whether the HARQ-ACK is CRC protected can be a proxy for determining whether the number of codeblock groups is larger than a predetermined threshold (as determined in flowchart 300), as the HARQ-ACK being CRC protected is proportional to the number of codeblock groups, and having to perform CRC encoding with the larger number of codeblock groups is more resource intensive than using the implicit signaling of 408.

Figure 5:
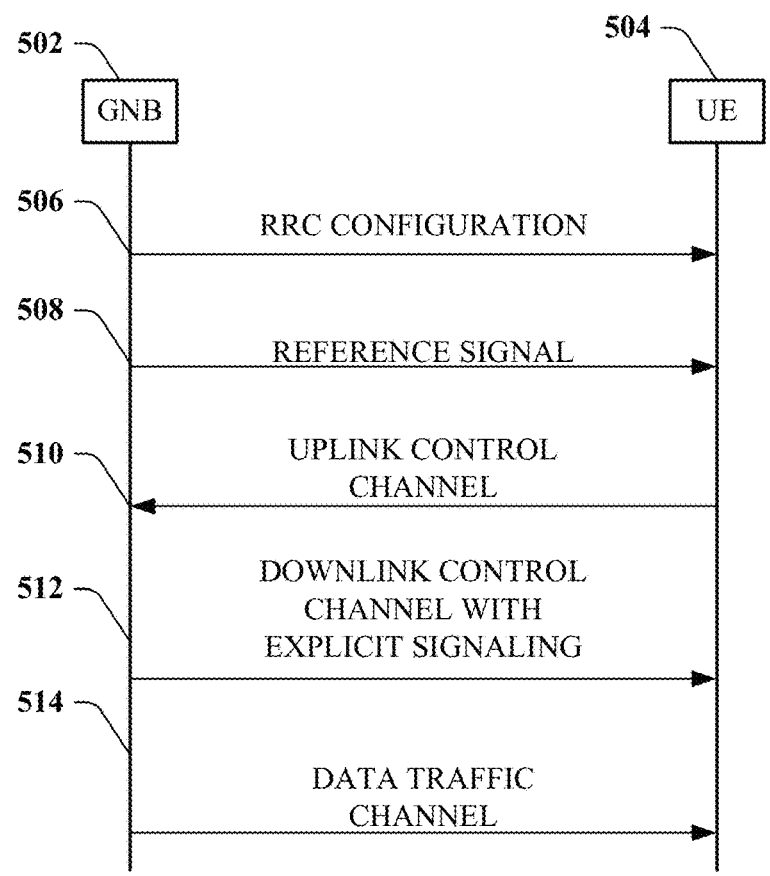
FIG. 5 illustrates an example block diagram showing a message sequence chart in accordance with various aspects and embodiments of the subject disclosure.

Turning now to FIG. 5, illustrated is an example block diagram showing a message sequence chart 500 in accordance with various aspects and embodiments of the subject disclosure.

In an embodiment, the message sequence chart can start at 506 where the base station device or gNB 502 remotely configures the UE 504. At the beginning of a cycle, or when a mobile device (e.g., mobile device 504) connects to the network, the gnB 502 remotely configures via a Radio Resource Control (RRC) protocol, the mobile device 504 to use a predetermined segmentation rate. The RRC can also be used to inform the UE 504 about the $L_{th}$ threshold at which explicit or implicit signaling is determined. The RRC protocol is a layer that exists between the UE 504 and the gNB 502 at the IP level. The major functions of the RRC protocol include connection establishment and release functions, broadcast of system information, radio bearer establishment, reconfiguration and release, RRC connection mobility procedures, paging notification and release and outer loop power control. By means of the signaling functions, the RRC configures the user and control planes according to the network status and allows for Radio Resource Management strategies to be implemented.

At 508 the gNB 502 sends a reference signal which are beamformed or non-beamformed and are such that the UE 504 can computes the channel estimates then computes the parameters needed for channel state information (CSI) reporting. The CSI report consists of for example channel quality indicator (CQI), precoding matrix index (PMI), rank information (RI), the best sub band indices, best beam indices etc.

The CSI report is sent back to the gNB 502 on an uplink control channel 510, and based on the CSI report, the gNB 502 can provide downlink control information on downlink control channel 512 that provides scheduling and other parameters for the data traffic transmission on data traffic channel 514. The uplink control channel 510 can also include HARQ-ACK or NAK information indicating one or more codeblock groups contained errors in a previous transmission. The gNB 502 can then determine whether the number of codeblocks is less than the threshold number, and use explicit signaling with the downlink control channel 512 to indicate using a bit map which of the codeblock groups will be retransmitted. In other embodiments, the gNB 502 can determine to use explicit signaling in response to determining that the HARQ-ACK received in the uplink control channel 510 was not CRC protected. The gNB 502 can then retransmit the codeblock groups in the data traffic channel 514.

Figure 6:
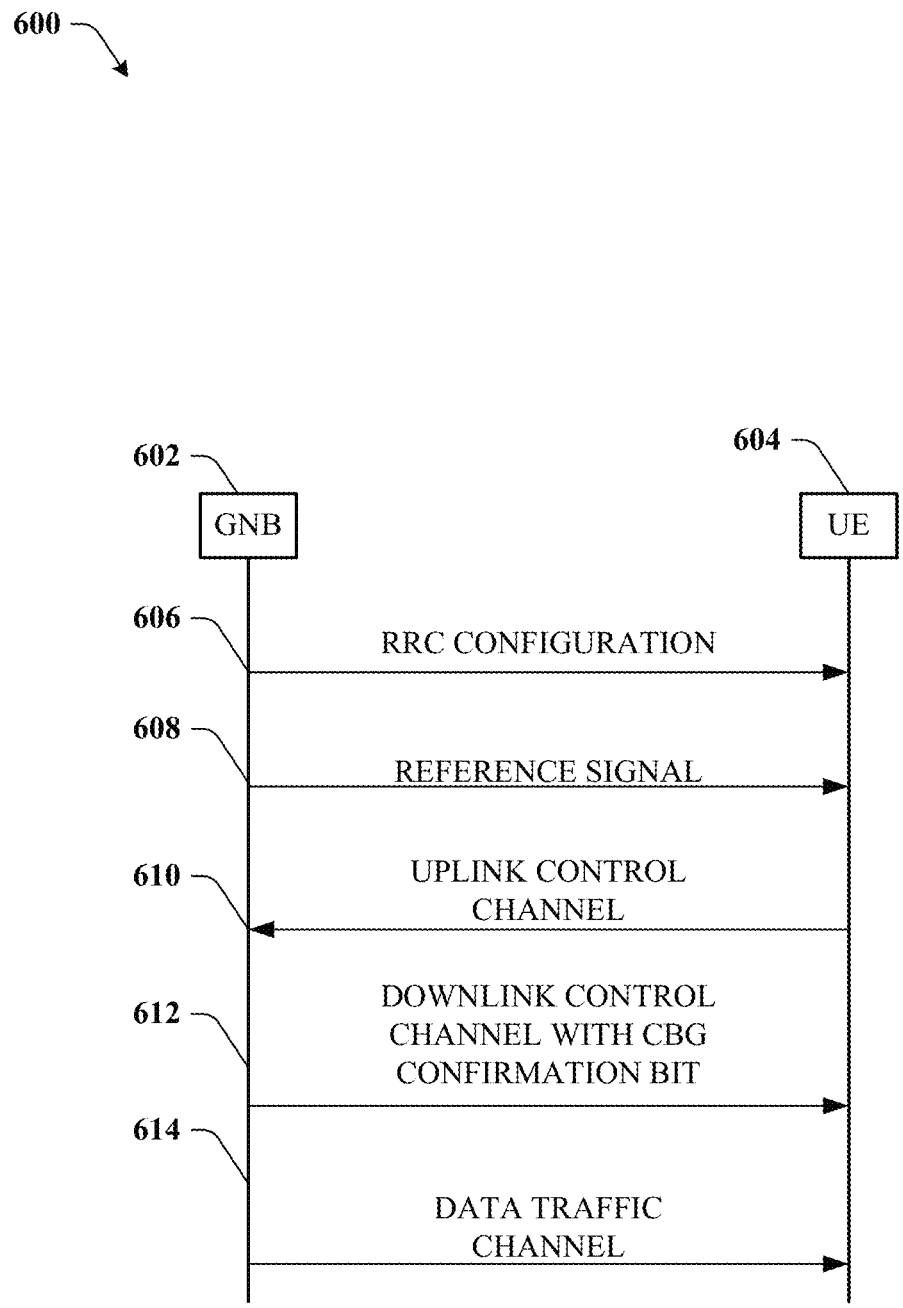
FIG. 6 illustrates an example block diagram showing a message sequence chart in accordance with various aspects and embodiments of the subject disclosure.

Turning now to FIG. 6, illustrated is an example block diagram showing a message sequence chart 600 in accordance with various aspects and embodiments of the subject disclosure.

In an embodiment, the message sequence chart can start at 606 where the base station device or gNB 602 remotely configures the UE 604. At the beginning of a cycle, or when a mobile device (e.g., mobile device 604) connects to the network, the gnB 602 remotely configures via a Radio Resource Control (RRC) protocol, the mobile device 604 to use a predetermined segmentation rate. The RRC can also be used to inform the UE 604 about the $L_{th}$ threshold at which explicit or implicit signaling is determined. The RRC protocol is a layer that exists between the UE 604 and the gNB 602 at the IP level. The major functions of the RRC protocol include connection establishment and release functions, broadcast of system information, radio bearer establishment, reconfiguration and release, RRC connection mobility procedures, paging notification and release and outer loop power control. By means of the signaling functions, the RRC configures the user and control planes according to the network status and allows for Radio Resource Management strategies to be implemented.

At 608 the gNB 602 sends a reference signal which are beamformed or non-beamformed and are such that the UE 604 can computes the channel estimates then computes the parameters needed for channel state information (CSI) reporting. The CSI report consists of for example channel quality indicator (CQI), precoding matrix index (PMI), rank information (RI), the best sub band indices, best beam indices etc.

The CSI report is sent back to the gNB 602 on an uplink control channel 610, and based on the CSI report, the gNB 602 can provide downlink control information on downlink control channel 612 that provides scheduling and other parameters for the data traffic transmission on data traffic channel 614. The uplink control channel 610 can also include HARQ-ACK or NAK information indicating one or more codeblock groups contained errors in a previous transmission. The gNB 602 can then determine whether the number of codeblocks is more than the threshold number, and use implicit signaling with the downlink control channel 612 to indicate using the codeblock group confirmation bit in the downlink control information whether the HARQ process will include retransmission of just the codeblock groups that received a NAK or the entire transport block. In other embodiments, the gNB 602 can determine to use the confirmation bit in response to determining that the HARQ-ACK received in the uplink control channel 610 was CRC protected. The gNB 602 can then retransmit the codeblock group or transport block in the data traffic channel 614.

In an embodiment, at the beginning the network to configure the UEs with number of codeblock group (AL) per each codeword i.e. if the network supports up to 4 layer MIMO transmission, then one value of L for physical downlink shared channel (PDSCH) transmission and one value of L for physical uplink shared channel (PUSCH) transmission. However if the network supports up to 8 layer transmission, the network needs to indicate two value of L which corresponds to respective codewords for PDSCH and one value of L for PUSCH transmission. We propose that the network sends this information via RRC or higher layer signaling during 506 or 606. In addition the network needs to enable codeblock group based (re) transmission (via RRC signaling). Once the UE sends the failed codeblock groups to the network via uplink feedback channel, the network can use codeblock group confirmation bit equal to one and send this information in the downlink control channel. For data transmission, the network sends only those codeblock groups which are NAK as communicated by the UE.

Figure 7:
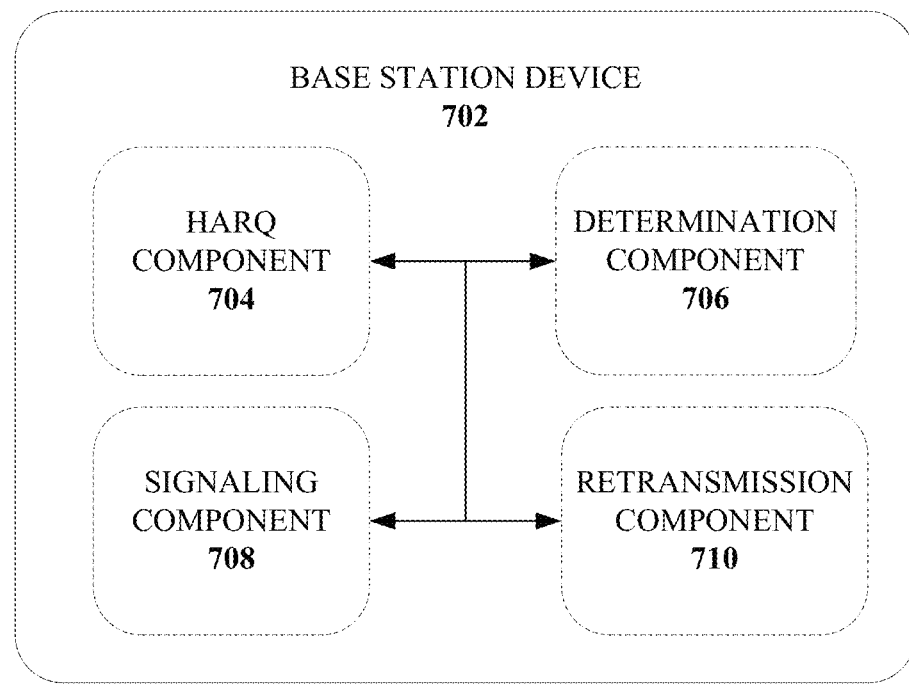
FIG. 7 illustrates an example block diagram showing a base station device in accordance with various aspects and embodiments of the subject disclosure.

Turning now to FIG. 7, illustrated is an example block diagram showing a message sequence chart 700 in accordance with various aspects and embodiments of the subject disclosure.

Base station device 702 can include a HARQ component 704 that receives the ACK or NAK from the user equipment device and determines which codeblock groups need to be retransmitted. The determination component 706 then determines the number of codeblock groups based on the maximum number of codeblock groups as configured by the network, i.e. it is signaled to the UE using RRC signaling. In another embodiment, the determination component 706 can compute the number of codeblock groups scheduled for the UE in that particular slot (or TTI). Note that in this case the value of L can be less than the maximum number of codeblock groups (as signaled to the UE using RRC signaling).

The determination component 706 can determines whether the number of codeblock groups L is smaller or greater than $L_{th}$, the predetermined threshold number of codeblock groups. $L_{th}$ can be determined by the determination component 706 based on the standard set by the network, or based on network conditions. In various embodiments, $L_{th}$ can be 11 or 15 or some other number.

If L is smaller than $L_{th}$, then the signaling component 708 can use an explicit method of signaling to the receiver. The explicit method can be a bit map indicating the identities of the codeblock groups that are being retransmitted. This is only done however when the number of codeblock groups is relatively small, otherwise the bit map can be very long and the signaling can consume a lot of processing resources and bandwidth. As an example, say the network configures the number of code block groups (N) for the highest number of resources elements say 6600, and where the maximum codeblock size is 8192. Then the bit map length is =6600*8*14*4/8192=90.2344, where the 14 represents the timestamp, and the 4 represents the maximum number of layers. The bit map would thus be around 90 bits long. Then for every retransmission, the network needs to send a bit map of length equal to 90 bits in the downlink control channel. Where the bits positions corresponding to the failed code block groups are set to 1, which indicates to the UE that those codeblock groups are retransmitted.

Due to this, an improvement in network efficiency and reduction in bandwidth can be achieved if the signaling component 708, in response to the L being larger than $L_{th}$, uses implicit signaling to indicate the retransmitted codeblock groups. The signaling component 708 can incorporate a codeblock group confirmation bit in the downlink control information, which, if activated can indicate to the UE that that network retransmitted the same codeblock groups which were reported as NAK by the UE for the previous downlink transmission for the same HARQ process identifier. When this bit is sent to zero, then the UE should understand that the network is not using codeblock group based re(transmission) and is using conventional HARQ process at the transport block level (e.g., retransmitting the entire transport block, including those codeblock groups that were successfully received and decoded).

In some embodiments, there can be no confirmation bit at all, where the signaling component 708 may skip indicating the codeblock groups confirmation bit in the downlink control channel. This is because, if the and network and the UE know during retransmissions, the network uses the failed codeblock groups as indicated by the UE will be retransmitted, then there is no use of codeblock group confirmation bit. The retransmission component 710 can then retransmit the codeblock groups or transport block based on the signaling method performed by the signaling component 708

Figure 8:
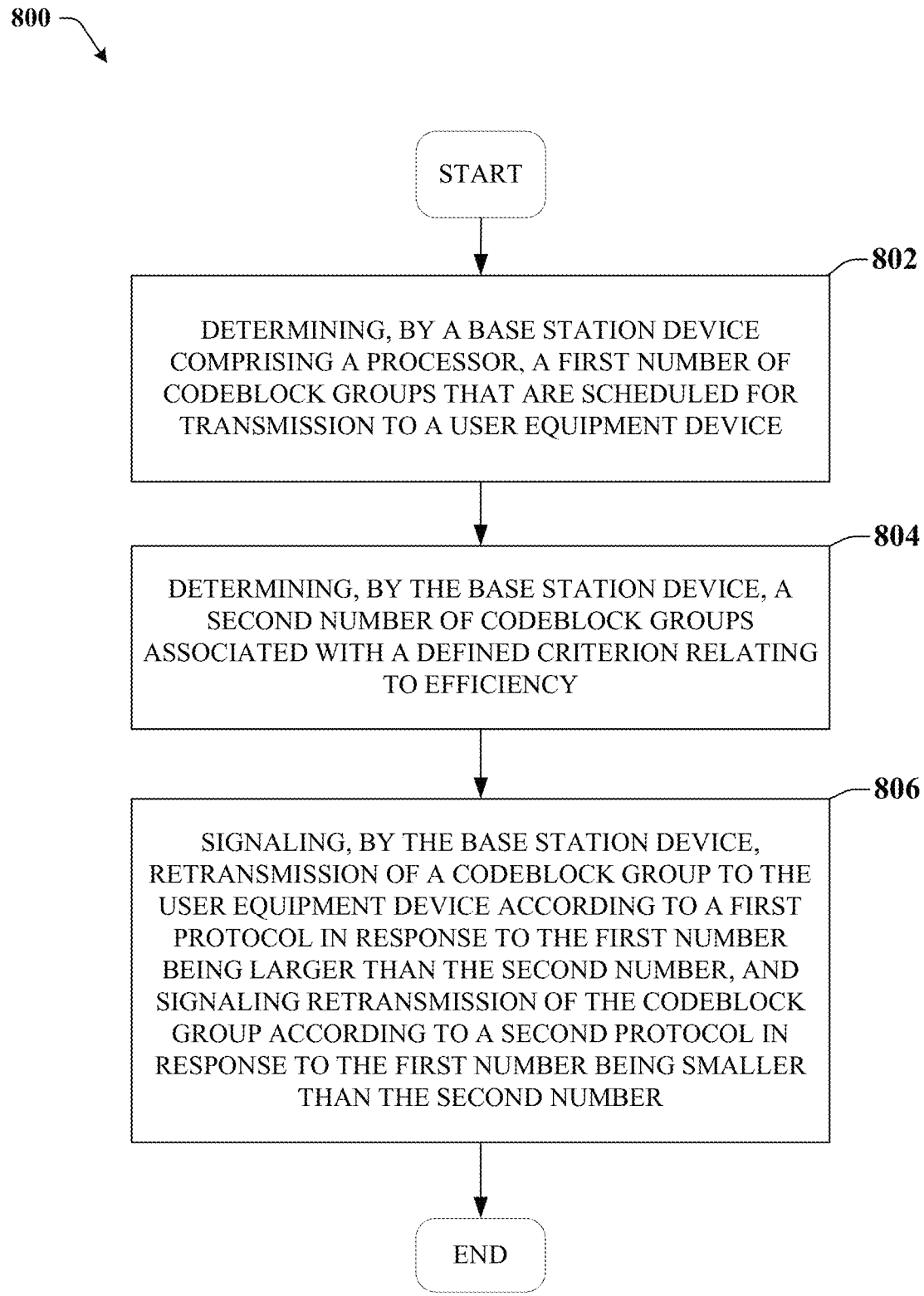
FIG. 8 illustrates an example method for signaling retransmitted codeblock groups in accordance with various aspects and embodiments of the subject disclosure.

FIG. 8 illustrates a process in connection with the aforementioned systems. The process in FIG. 8 can be implemented for example by the systems in FIGS. 1-7 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 8 illustrates an example method 800 for signaling retransmitted codeblock groups in accordance with various aspects and embodiments of the subject disclosure.

Method 800 can begin at 802 wherein the method includes determining, by a base station device comprising a processor, a first number of codeblock groups that are scheduled for transmission to a user equipment device.

At 804, the method can include determining, by the base station device, a second number of codeblock groups associated with a defined criterion relating to efficiency.

At 806, the method can include signaling, by the base station device, retransmission of a codeblock group to the user equipment device according to a first protocol in response to the first number being larger than the second number, and signaling retransmission of the codeblock group according to a second protocol in response to the first number being smaller than the second number.

Figure 9:
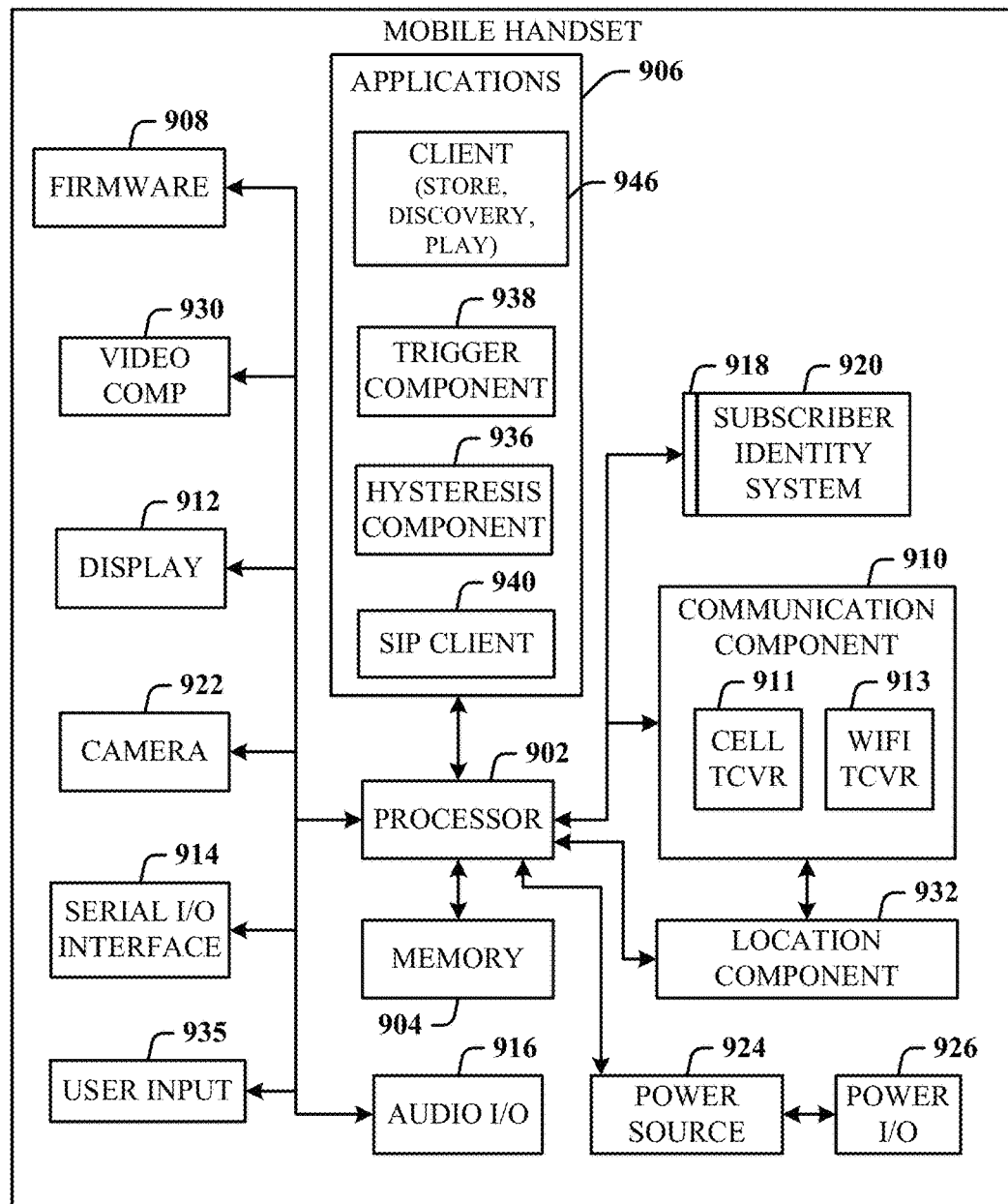
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
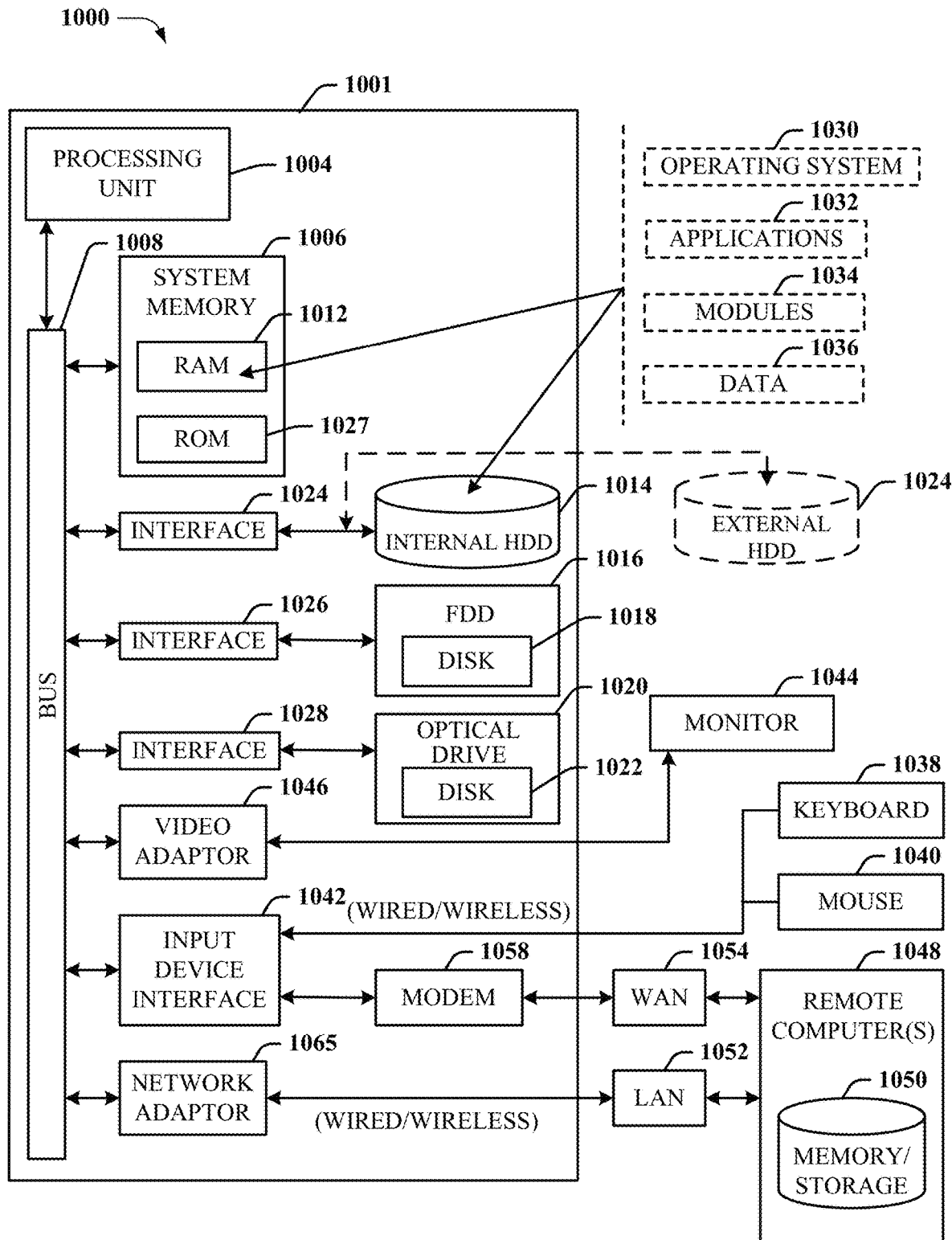
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 406) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A base station device, comprising:
   a processor; and
   a memory that stores executable instructions that, when executed by the processor, facilitate performance of operations, comprising:
      receiving a request, from a user equipment device, to retransmit a codeblock group, wherein the codeblock group was previously transmitted to the user equipment device;
      determining whether the request to retransmit comprises cyclic redundancy check bits appended to the request;
      in response to the cyclic redundancy check bits being determined to be appended to the request, transmitting downlink control information comprising a codeblock group indicator bit that signals a mode of retransmission; and
      in response to the cyclic redundancy check bits being determined not to be appended to the request, transmitting a bit map indicating an identity of the codeblock group and retransmitting the codeblock group.

2. The base station device of claim 1, wherein the indicator bit is set to a first value.

3. The base station device of claim 2, wherein the retransmitting further comprises retransmitting the codeblock group that received a negative acknowledgement from the user equipment device.

4. The base station device of claim 3, wherein the operations further comprise:
   receiving the negative acknowledgement during a hybrid automatic repeat request process.

5. The base station device of claim 1, wherein the indicator bit is set to a second value.

6. The base station device of claim 1, wherein the operations further comprise:
   in response to determining that a number of codeblock groups for the codeblock group satisfies a defined criterion, retransmitting the codeblock group to the user equipment device based on the mode.

7. The base station device of claim 4, wherein the retransmitting further comprises retransmitting a transport block associated with the codeblock group.

8. A method comprising:
   determining, by a base station device comprising a processor, a first number of codeblock groups that are scheduled for transmission to a user equipment device;
   determining, by the base station device, a second number of codeblock groups associated with a defined criterion relating to efficiency; and
   signaling, by the base station device, retransmission of a codeblock group to the user equipment device according to a first protocol in response to the first number being larger than the second number, and signaling retransmission of the codeblock group according to a second protocol in response to the first number being smaller than the second number.

9. The method of claim 8, wherein the determining the first number of codeblock groups is based on radio resource control signaling to the user equipment device.

10. The method of claim 8, wherein the second number of codeblock groups corresponds to a number of cyclic redundancy check bits appended to codeblock groups of the first number of codeblock groups.

11. The method of claim 8, wherein the second number of codeblock groups is based on channel conditions reported by the user equipment device.

12. The method of claim 8, wherein the signaling the retransmission of the codeblock group according to the first protocol comprises signaling with an indicator bit in downlink control information.

13. The method of claim 12, further comprising:
retransmitting, by the base station device, the codeblock group that received a negative acknowledgement from the user equipment device in a previous transmission time interval in response to the indicator bit being determined to comprise a first value.

14. The method of claim 12, further comprising:
retransmitting, by the base station device, a transport block associated with the codeblock group in response to the indicator bit being determined to comprise a second value.

15. The method of claim 12, further comprising:
retransmitting, by the base station device, the codeblock group that received a negative acknowledgement from the user equipment device in a previous transmission time interval in response to there being no indicator bit.

16. The method of claim 8, wherein the signaling the retransmission of the codeblock group according to the second protocol comprises transmitting a bit map identifying the codeblock group.

17. A machine-readable storage medium, comprising executable instructions that, when executed by a processor of a device, facilitate performance of operations, comprising:
determining a first number of codeblock groups that are scheduled for transmission to a user equipment device;
determining a second number of codeblock groups associated with a predetermined criterion relating to efficiency;
signaling retransmission of a codeblock group to the user equipment device in a first manner in response to the first number being determined to be larger than the second number; and
signaling retransmission of the codeblock group in a second manner in response to the first number being determined to be smaller than the second number.

18. The machine-readable storage medium of claim 17, wherein the signaling the retransmission of the codeblock group in the first manner comprises signaling with an indicator bit in downlink control information.

19. The machine-readable storage medium of claim 18, wherein the operations further comprise:
retransmitting the codeblock group that received a negative acknowledgement from the user equipment device in a previous transmission time interval in response to the indicator bit comprising a first value.

20. The machine-readable storage medium of claim 17, wherein the signaling the retransmission of the codeblock group in the second manner comprises transmitting a bit map identifying the codeblock group.

* * * * *